United States Patent
Bates (10) Patent No.: US 6,748,039 B1
(45) Date of Patent: Jun. 8, 2004

(54) SYSTEM AND METHOD FOR SYNCHRONIZING A SKIP PATTERN AND INITIALIZING A CLOCK FORWARDING INTERFACE IN A MULTIPLE-CLOCK SYSTEM

(75) Inventor: Michael E. Bates, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 684 days.

(21) Appl. No.: 09/637,710

(22) Filed: Aug. 11, 2000

(51) Int. Cl.⁷ .............................. H04L 7/00; G06F 13/42
(52) U.S. Cl. ...................... 375/354; 375/372; 713/400
(58) Field of Search ................................ 375/354, 371, 375/372; 713/400, 401, 500–503

(56) References Cited

U.S. PATENT DOCUMENTS

| | | | | |
|---|---|---|---|---|
| 4,007,441 A | * | 2/1977 | Faber | 375/259 |
| 4,419,739 A | | 12/1983 | Blum | |
| 4,866,310 A | | 9/1989 | Ando et al. | |
| 5,045,725 A | | 9/1991 | Sasaki et al. | |
| 5,224,129 A | | 6/1993 | Lueker et al. | |
| 5,434,996 A | * | 7/1995 | Bell | 713/400 |
| 5,448,715 A | | 9/1995 | Lelm et al. | |
| 5,689,689 A | | 11/1997 | Meyers et al. | |
| 5,768,529 A | | 6/1998 | Nikel et al. | |
| 5,909,563 A | | 6/1999 | Jacobs | |
| 5,961,649 A | | 10/1999 | Khandekar et al. | |
| 5,999,023 A | | 12/1999 | Kim | |
| 6,049,887 A | * | 4/2000 | Khandekar et al. | 713/503 |
| 6,081,904 A | | 6/2000 | Chencinski et al. | |
| 6,275,547 B1 | * | 8/2001 | Saeki | 375/354 |
| 6,424,688 B1 | * | 7/2002 | Tan et al. | 375/354 |
| 6,577,693 B1 | * | 6/2003 | Wolf | 375/372 |
| 6,581,164 B1 | * | 6/2003 | Felts et al. | 713/400 |
| 6,681,272 B1 | * | 1/2004 | Anderson et al. | 710/52 |

FOREIGN PATENT DOCUMENTS

EP        345 807        12/1989

OTHER PUBLICATIONS

International Search Report, PCT/US 01/14902, mailed Jan. 30, 2002.

AMD Athlon™ Processor Technical Brief, Dec. 1999, ® Advanced Micro Devices, Inc., pp. 1–7.

AMD Athlon™ Processor Module Data Sheet, Jun. 2000, ® Advanced Micro Devices, Inc., pp. 1–64.

LXT9785 Data Sheet, Sep. 2000, ® Level One Communications, Inc., pp. 1–105.

* cited by examiner

Primary Examiner—Jean B. Corrielus
Assistant Examiner—Qutub Ghulamali
(74) Attorney, Agent, or Firm—Meyertons Hood Kivlin Kowert & Goetzel, P.C.; B. Noël Kivlin (57) ABSTRACT

A system and method for synchronizing the skip pattern to two clock domains and initializing the clock skipping buffer which enables data transfers between the two clock domains. In one embodiment, a circuit comprises a pair of alignment detection units, a synchronous reset unit, a skip pattern generator, a counter reset unit and a data transfer buffer. Each of the alignment units is configured to detect the alignment of the clock signal in one of the clock domains with a reference clock signal and generate a signal indicative of the alignment. This signal is conveyed to the synchronous reset unit and the counter reset unit. The alignment signal generated by one alignment unit is also conveyed to the skip pattern generator. The synchronous reset unit accepts the alignment signals from the alignment units and generates concurrent reset signals (i.e., one for each of the two clock domains) to initialize the counter reset unit. The counter reset unit controls the load and unload counters which control the flow data through the data transfer buffer. After the synchronous reset signals generated by the synchronization reset unit are received, the counter reset unit begins generating load and unload pulses corresponding to the respective clock domains and transmitting these signals to the data transfer buffer.

17 Claims, 4 Drawing Sheets

SYSTEM AND METHOD FOR SYNCHRONIZING A SKIP PATTERN AND INITIALIZING A CLOCK FORWARDING INTERFACE IN A MULTIPLE-CLOCK SYSTEM

BACKGROUND OF THE INVENTION

1. Field of the Invention

This invention is related generally to the field of microprocessor design and more particularly to synchronizing skip patterns and initializing the transfer buffer in a system which is configured to transfer data between two clock domains using clock skipping techniques.

2. Description of the Related Art

In simple computer systems, a single clock signal may be used to run all of the devices which are integrated into the chip. The same clock signal may be provided to a microprocessor, a memory and/or various peripheral devices. The signal is used for, among other things, clocking data transfers between the devices. This system is simple and relatively straightforward, but its simplicity can result in performance limitations. One of these limitations relates to the variations in the clock signals which are seen by the various devices on the chip. The use of a network of conductive traces to deliver the clock signal to each of the devices causes reflections, noise and other variations in the signals. These factors cause differences in the signals arriving at the different devices, which may in turn limit the devices' ability to communicate data. For example, if there is a skew between the clock signals arriving at two devices, a value being communicated between the devices may have to be asserted by the transmitting device for a longer time than would otherwise be necessary in order to ensure that the value can be sampled by the receiving device.

Clock forwarding is one technique which can be used to minimize the impact of clock skew and allow improved performance in data transfers. In a clock forwarding scheme, the data bus and system clock which are normally used to transfer data are replaced by point-to-point data and clock signals. In other words, when data is to be transferred from one device to another, the data is transferred along with a corresponding clock signal. The data is typically clocked into a series of storage locations (e.g., flip-flops) by the transmitting device according to the forwarded clock signal. The data is then clocked out of the storage locations by the receiving device according to a local clock signal. Both of the clock signals must have the same rate, but a substantial skew in the signals will not prevent reliable transfer of the data.

While clock forwarding provides a means to transfer data between devices operating at the same clock rate, it is often desirable in modern computer systems to use different clock frequencies for different devices. For example, it may be useful to operate the core logic (i.e., the microprocessor logic) and the system logic at different frequencies. The difference in frequencies allows for advances in the performance of one type of logic without requiring equal advances in the other type of logic. Thus, for example, the processor speed can be increased without having to also speed up the system logic.

In these systems, system logic is closely tied to the system bus. As a result, the system logic usually operates at a frequency which is an integer (or half-integer) multiple of the system bus frequency. Because the system logic operates at a frequency which is a multiple of the system bus frequency, clock signals for the system logic and clock signals for the system bus can both be generated from the same reference clock. If the core logic also runs at a frequency which is an integer or half-integer multiple of the system bus frequency, it can also be easily generated. For example, if the system bus is running at 66 MHz, the system logic and core logic can be operated at 200 MHz (three times the system bus frequency). Then, if desired, the frequency of the core logic can be scaled up to 266 MHz (four times the system bus frequency), while the system logic remains at 200 MHz.

As the operating frequency of the system bus increases, however, it becomes more and more difficult to scale up the speed of the core logic because this would require a larger increase in the frequency. For example, if the system bus is running at 200 MHz and both the core logic and the system logic are running at 400 MHz, the core logic cannot be easily scaled up to 450 MHz. That is, 450 MHz is not an integer or half-integer multiple of the system bus frequency. It may therefore be useful to have multiple clocks instead of a single one. The devices which operate on a particular clock signal are within the clock domain defined by that signal.

The use of multiple clock domains in a computer system may create a number of problems which must be addressed in the system. One problem is that it is difficult to communicate between two clock domains in which the clocks are not integer or half-integer multiples of each other. This problem may be addressed by using clock skipping techniques to transfer data between the two clock domains. Implementing clock skipping in a microprocessor may be difficult, however, since it requires synchronization of the skip pattern to the clock signals in the two domains and proper initialization of the transfer buffers which are used to transfer data.

SUMMARY OF THE INVENTION

One or more of the problems described above may be solved by the various embodiments of the invention. Broadly speaking, the invention comprises a system and method for synchronizing a skip pattern to the clock signals of two clock domains and initializing the clock skipping buffer which enables data transfers between the two clock domains.

The present system is implemented in a microprocessor which has two distinct clock domains, each operating at a different clock frequency. The microprocessor is configured to transfer data from one clock domain to the other using a clock skipping buffer. Data is clocked into the buffer using the clock signal of the first clock domain, and is clocked out of the buffer using the clock signal of the second clock domain. The buffer causes pulses of the faster clock signal to be periodically skipped so that the data transferred on pulses of the faster clock signal does not overrun the data transferred on pulses of the slower clock signal.

In one embodiment, the present system comprises an alignment circuit having an alignment detector portion, a programmable delay portion and a signal offset portion. The alignment detector portion of the circuit identifies the falling edge of the clock signal in one of the clock domains that corresponds to the falling edge of a divider output signal which is locked to the reference clock by a PLL. The alignment signal is delayed for an amount of time which is programmable to correspond to the remainder of a reference clock period. The programmable delay portion of the circuit thereby produces an alignment signal which is asserted the next time the falling edges of the two clock signals are coincident. The circuit also produces a skip reset signal which is offset a predetermined number of cycles prior to the alignment signal. The skip reset signal leads the alignment signal so that the skip pattern generator can produce and apply the first skip value of the skip pattern with the assertion of the alignment signal.

One embodiment further comprises a synchronous reset circuit which is configured to produce synchronized reset signals in the two clock domains. The synchronous reset circuit accepts a primary reset signal and clocks this signal from a reference clock domain, through several intermediate steps into one of the two operating clock domains. When the reset signal has been clocked into this clock domain, the circuit delays the reset until the arrival of the next corresponding alignment signal. The reset is then transferred as logically concurrent, synchronized reset signals asserted with the respective alignment signal in each clock domain.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described below. It should be noted that this embodiment is presented as an example to illustrate the features and operation of the invention and that many other embodiments of the invention are possible.

Broadly speaking, a system and method for synchronizing the reset signals in two clock domains and initializing the clock skipping buffer which enables data transfers between the two clock domains are disclosed. One embodiment is implemented in a microprocessor which has components in two different clock domains, each of which has a different clock frequency. The clock signals of the two domains are generated from a single reference clock signal and the frequency of each is a multiple or half-multiple of the reference clock frequency. The clock signals are therefore aligned with the reference clock signal at least once every period of the reference clock if they are multiples, or every other period if they are half-multiples of the reference clock. The clock signals of the clock domains are logically aligned by detecting the falling edge of each clock that is logically coincident with that of the reference clock signal. An alignment signal is asserted in each of the clock domains at the same time as the coincident pulse of the respective clock signal, thereby identifying the aligned, or '0' pulse. This occurs every reference clock period (or every other reference clock period if the corresponding clock signal is a half-multiple of the reference clock signal.) A skip pattern reset signal which leads the alignment signals is also generated and conveyed to a skip pattern generator, which can then generate a skip pattern that starts concurrently with the alignment signals. An asynchronous reset signal is transferred to one of the clock domains and synchronized with the alignment signal in that domain. The aligned reset signal is then delayed by an amount which is at least as great as the maximum skew between the clock signals. Upon assertion of the next alignment signal in each of the clock domains, a synchronous reset signal (which is aligned with the respective alignment signal) is asserted to reset the respective counters of the clock skipping buffer.

In one embodiment, the present system is included in a highly integrated, high-performance microprocessor. This processor uses two main clock domains—XICLK, which is the CPU core clock, and XBCLK, which is used to run the system interface logic. The microprocessor uses clock skipping techniques to efficiently transfer data between these two clock domains. In a clock skipping system, data is temporarily stored into sequential storage locations. The data is delivered to the storage locations when a corresponding clock pulse of the first clock signal is received. The data is retrieved from the storage locations in the order they were stored. Data is retrieved from one of the storage locations when a corresponding clock pulse of a second clock signal from the second clock domain is received. Because the first and second clock signals in this embodiment have different clock rates, one or more clock pulses of the faster of the signals must be skipped in order to prevent the associated process (either loading the storage locations or unloading them) from overrunning or outrunning the other process.

Figures 1, 2:
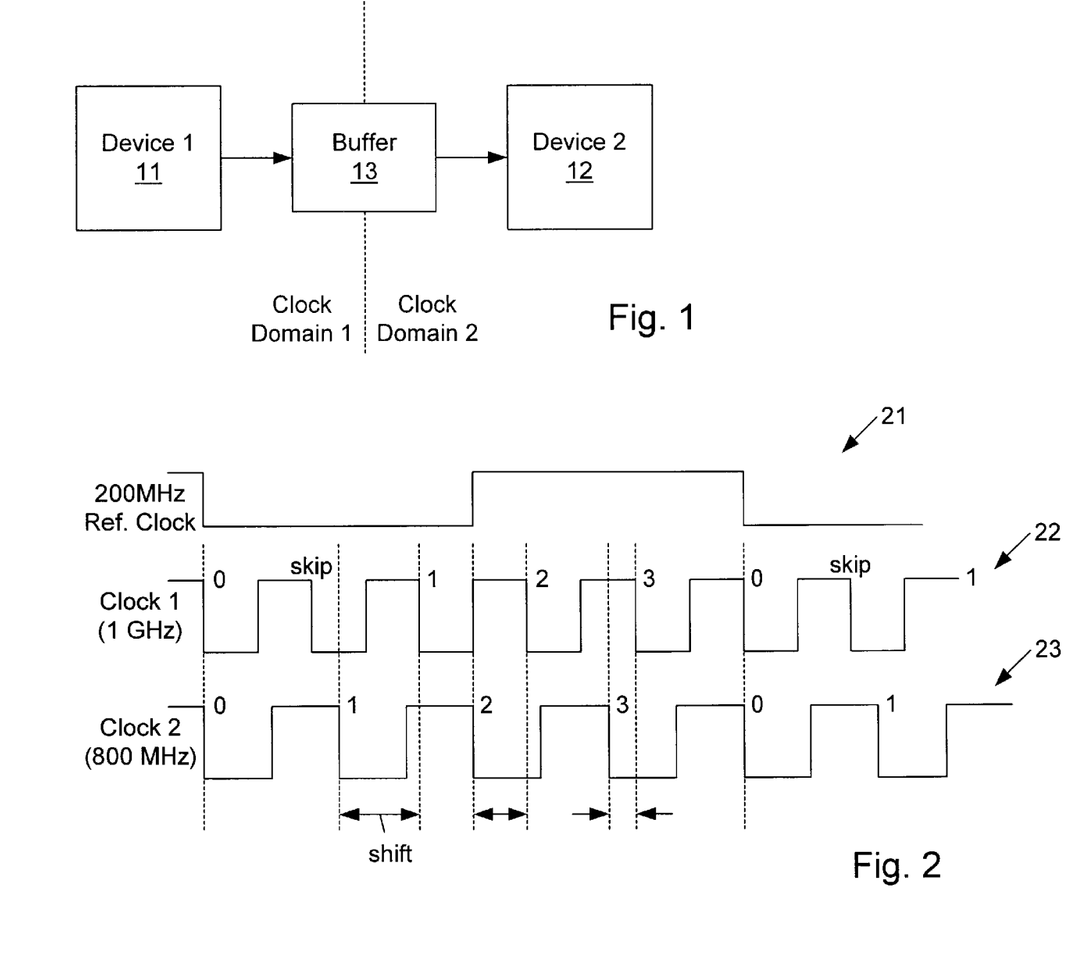
FIG. 1 is a block diagram illustrating the transfer of data from one clock domain to another using an intermediate buffer.
FIG. 2 is an illustration of the clock skipping technique used in one embodiment of the present system.

Referring to FIG. 1, a system in which a first device 11 transfers data to a second device 12 is illustrated. Device 11 resides in a first clock domain, while device 12 resides in a second clock domain. As indicated above, a clock domain comprises the devices that operate based on the clock signal of that domain. The clock signals of the respective clock domains are output by phase locked loops (PLL's) that are running at different multiples of a common reference clock frequency.

The data transmitted from device 11 to device 12 is transferred through clock skipping buffer 13. Data is clocked into buffer 13 on pulses of the clock signal in the first clock domain, and is clocked out of the buffer on pulses of the clock signal in the second clock domain. Clock skipping is used to equalize the transfer of data into and out of the buffer.

Referring to FIG. 2, the clock skipping technique is illustrated. FIG. 2 shows three clock signals: a reference clock signal 21, a clock signal from a first clock domain 22 and a clock signal from a second clock domain 23. The clock signals in the two clock domains are multiples of the reference clock signal. In the example of the figure, clock signal 22 has a frequency which is five times that of reference clock signal 21. Clock signal 23 has a frequency which is four times that of reference clock signal 21.

As shown in FIG. 2, one out of every five pulses of clock signal 22 is skipped in data transfers. (For the purposes of this disclosure, "pulse" refers to an edge of a clock signal. The pulses may comprise the rising edges, falling edges, or both, depending upon the implementation of a particular embodiment.) Thus, in every reference clock period, there will be four valid pulses of clock signal 22 and one skipped pulse. It can be seen that clock signal 23 will also have four valid pulses in each reference clock period (but will have no skipped pulses.) The valid pulses are used to transfer data into and out of the buffer, so that for every reference clock period, four bits of data will be transferred in and four bits of data will be transferred out.

As shown in FIG. 2, there is no shift between the clock signals of the two clock domains at the beginning of the reference clock period. That is, they both have a falling edge at the same time as the reference clock. Because the first clock signal has a higher rate than the second, the second falling edge of the first signal occurs before the second falling edge of the second signal. Thus, a shift develops between the two signals. This shift varies throughout the reference clock period. Because every fourth pulse of clock signal 22 is skipped, however, the shift is always less than or equal to the period of clock signal 22. This shift is absorbed by the clock skipping buffer. Data is loaded into the buffer on the valid pulses of one of the clock signals and then, after waiting for a period long enough to ensure that the data has been written, the data is unloaded from the buffer on the valid pulses of the other clock signal.

FIG. 2 illustrates that, in relation to the reference clock signal, the second pulse of clock signal 22 in every reference clock period is skipped. If the first falling edge of each clock signal is synchronized with the falling edge of the reference clock signal, skipping the second pulse in each reference clock period ensures that the pulses of the first clock signal will always be in synchronization with, or shifted to the right of (i.e., lagging behind) the corresponding pulses of clock signal 23. In other embodiments, the first clock signal may be shifted to the left or the shift may be to both sides of the second signal. It is important to note that constraining the shift of one signal to always fall on one side of the other signal allows a single buffer to be used to absorb the shift. If the shift is allowed to be on the right at some times and on the left at other times, two buffers will be needed to absorb the shift because neither of the buffers will absorb a full clock period of the shift. It should be noted that, in other embodiments, more than a single pulse may be skipped, depending upon the relative frequencies of the respective clock signals.

Figure 3:
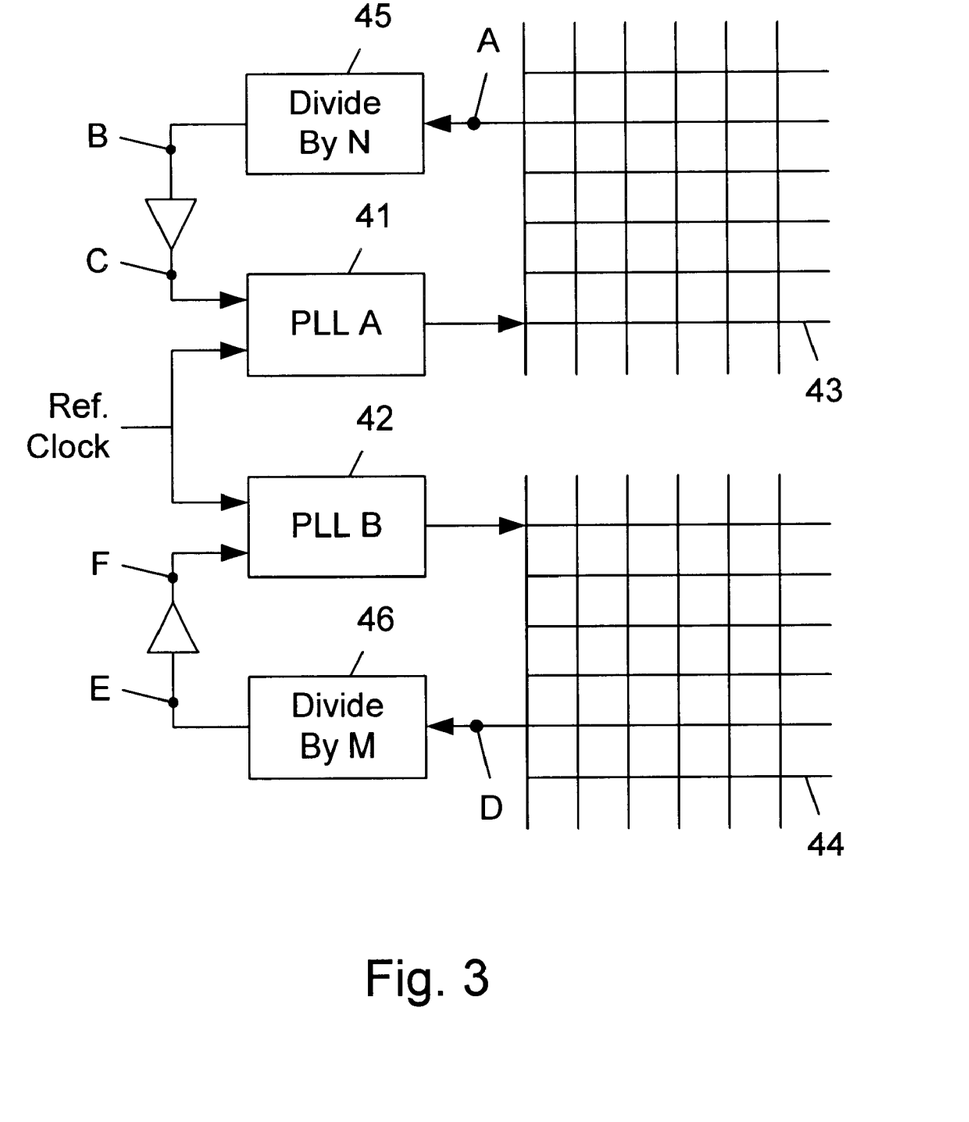
FIG. 3 is a functional block diagram illustrating the manner in which the clock signals are generated in one embodiment.

Referring to FIG. 3, a functional block diagram illustrating the manner in which the clock signals are generated is shown. A reference clock signal is input to each of two PLLs 41, 42. Each PLL generates a clock signal having a frequency which is a multiple of the reference clock frequency. In this case, PLL 41 generates a first clock signal which is N times the frequency of the reference clock. PLL 42 generates a second clock signal which is M times the reference clock frequency. Each of the PLLs conveys its clock signal to a corresponding clock distribution network 43, 44. The distribution networks convey the first and second clock signals to the devices in the respective clock domains. The distribution networks convey the clock signals to divider circuits 45, 46, which produce feedback signals to be input to the PLLs. Each divider circuit divides the corresponding clock signal by the factor corresponding to that domains clock multiplier. In other words, PLL 41 generates a clock signal which is N times the reference clock frequency, and divider circuit 45 divides the clock signal by N to produce a feedback signal. Likewise, PLL 42 generates a clock signal which is M times the reference clock frequency, and divider circuit 46 divides the resulting clock signal by M to produce a feedback signal. The feedback signals are fed into the respective PLLs, which shift the generated clock signals to bring the feedback signals into alignment with the reference clock. By aligning each of the feedback signals with the reference clock signal, the system attempts to minimize the skew between the clock signals of the two clock domains.

It is important to minimize the skews between the clock signals for several reasons. As explained above, the clock skipping mechanism uses buffers to absorb the skew between the first clock domain and the second clock domain. If there is more skew, more buffers may be required to implement the mechanism. In addition to reducing the area required for the buffers needed in the clock skipping buffer, reducing the skew between the clock signals has the effect of reducing the latency of data transfers that use the buffer. In other words, the performance of the data transfer is improved.

Figure 4:
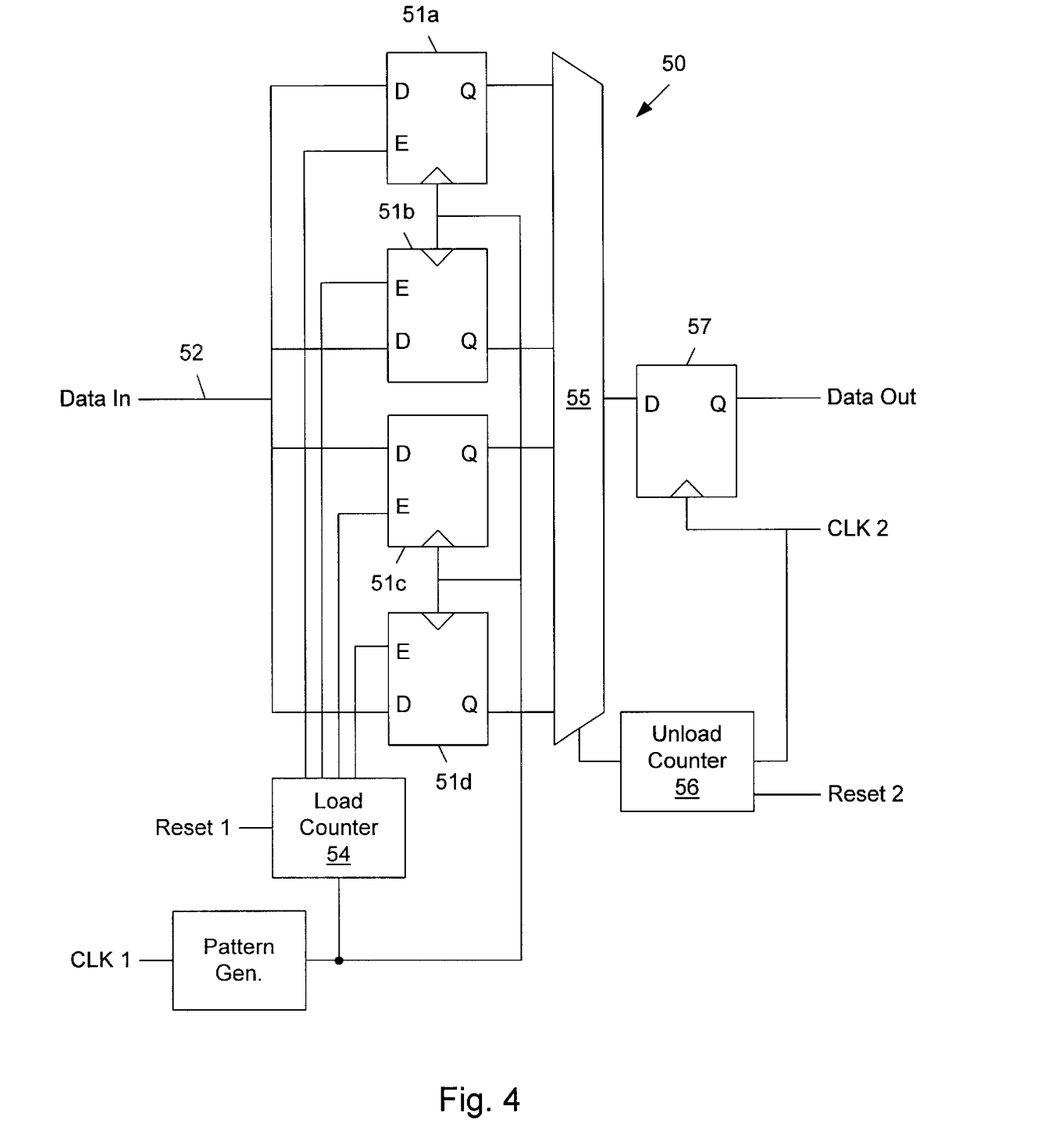
FIG. 4 is a block diagram illustrating the structure of a clock skipping buffer in one embodiment.

Referring to FIG. 4, the structure of a clock skipping buffer is shown. The circuit shown in this figure uses a set of storage locations (flip-flops) to buffer the data and absorb the clock shift between the clock signals of the transmitting and receiving clock domains. A series of data bits are transmitted to buffer 50 on data input line 52. Data input line 52 is coupled to the data (D) inputs of each of D-type flip-flops 51a–51d. (For purposes of convenience, flip-flops 51a–51d are individually and collectively referred to herein using the single reference number 51.) The clock input of each flip-flop 51 is coupled to clock line 53. The enable (E) input of each flip-flop 51 is coupled to one of the outputs of a load counter 54. Load counter 54 is controlled by the pattern generator (58) also clocked by the signal on line 53. The output (Q) of each flip-flop 51 is coupled to multiplexer 55. The select input of multiplexer 55 is coupled to an unload counter 56 that controls which of the multiplexer inputs (hence which of the flip-flop outputs) is selected to be output by multiplexer 55. Unload counter 56 is clocked by the clock signal of the receiving clock domain. The output of multiplexer 55 is coupled to the data input of flip-flop 57, which is clocked by the clock signal of the receiving clock domain. (Load counter 54 and unload counter 56 also have several control inputs which are used to reset the counters and which will be described in more detail below.)

Data is delivered to system 50 via line 52. Because the data input to each flip-flop 51 is tied to line 52, each data bit is simultaneously applied to each of the flip-flops. The data bit which is applied to the inputs of flip-flops 51 is only stored in the one of the flip-flops which is selected by load counter 54. Load counter 54 asserts an enable signal on one of its outputs and deasserts the enable signal on each of its remaining outputs. Each of the counter outputs is coupled to the enable input of a corresponding flip-flop so that only one of the flip-flops is enabled at one time. Consequently, the enabled flip-flop stores the currently applied data bit while the other flip-flops (which are disabled) retain the bits previously stored in them.

Pattern generator 58 produces a pattern of enable-Lprskip pulses. Each time a valid clock pulse is received, the counter is incremented. Each time load counter 54 is incremented, it asserts an enable signal on a successive one of the outputs coupled to flip-flops 51 (and deasserts the signal on the others.) Thus, each successive data bit is stored into a successive one of flip-flops 51. After a data bit is stored in the last one of flip-flops 51 (e.g. 51d,) the system cycles back to the first flip-flop (51a) and stores the next data bit in it. This cycle is repeated until all of the data is transferred. Although the data bit stored in each of the flip-flops will eventually be overwritten, each data bit will be retrieved before it is overwritten.

When a skip signal is output by the skip pattern generator (58), all enable lines out of the load counter are disabled and the counter is not incremented. The skip signal is also sent to the data source to hold off the transfer on that cycle.

Each of the flip-flops 51 asserts at its output the last data bit stored in the flip-flop (if any bit has yet been stored therein.) These bits are provided as inputs to multiplexer 55, which selects one of the inputs to be passed through to flip-flop 57. Multiplexer 55 is controlled by unload counter 56. Unload counter 56 provides a select signal to multiplexer 55 so that each of flip-flops 51 is sequentially selected in the order in which the data bits were stored into them. Unload counter 56 is clocked by the clock signal of the receiving clock domain and is incremented each CLK2 pulse. The bit output by the selected flip-flop 51 is forwarded to flip-flop 57. Flip-flop 57 is clocked by the signal from the second clock domain and retains the data for one clock period. It then receives the output of a newly selected flip-flop 51 and retains that bit for one clock period. Thus, the data bits are retrieved from flip-flops 51 in the same order in which they were stored, and a new serial data stream at the clock rate of the second clock domain is generated.

As indicated above, the data bit stored in each flip-flop 51 is selected by multiplexer 55 before it is overwritten with a new bit. This is accomplished by initializing load counter 54 and unload counter 56 to appropriate values at the beginning of the data transfer. The counter values are chosen to ensure that the data bits are stored on the appropriate interval before they are retrieved. For example, in the system illustrated in FIG. 4, load counter 54 may be initialized to 0 (selecting flip-flop 51a) while unload counter 56 may be initialized to 2 (selecting flip-flop 51c.) When the data transfer begins, the first data bit will be stored into flip-flop 51a. The first flip-flop which will be read is 51c, which does not yet have a data bit stored therein. Upon the subsequent valid pulse in each of the clock domains, the respective counters will increment so that the second data bit will be stored into flip-flop 51b, while the second flip-flop to be read will be 51d. Upon the next valid pulse, the third data bit will be stored into flip-flop 51c and multiplexer 55 will retrieve the first data bit from flip-flop 51a. Thus, the data bit stored in flip-flop 51a is read two clock periods after it is stored. If this were insufficient to ensure that the bit would be stored under all system skew conditions, the unload counter could be initialized to I to allow the data three clock periods to be stored. If only one clock period were necessary, the unload counter could be set to 3.

It is clear from the example above that a certain minimum number of flip-flops is necessary in order to allow each data bit to be written into a flip-flop a certain number of clock periods before being retrieved. The number of required flip-flops can be calculated according to the following equation:

$$\frac{period_{target\ clock} + delay_{max} - delay_{min} + T_{skew} + T_{setup} + T_{hold}}{T_{bit}} + N_{shift}$$

Where:
$period_{target\ clock}$ is the clock period of the receiving clock domain (since each data bit, or bit, is transferred on a falling clock edge in the example above, the clock period would be equal to the bit time;)

$delay_{max}$ is the maximum signal delay between the clock domains (if the transmitter and receiver logic are placed next to each other on the clock domain boundary, the delay should be essentially 0;)

Figure 6:
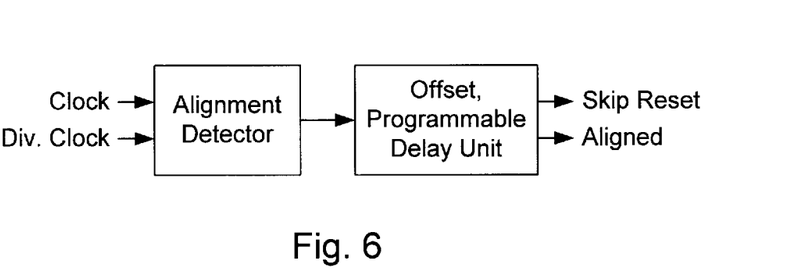
FIG. 6 is a functional block diagram of an alignment unit in one embodiment.
Figure 7:
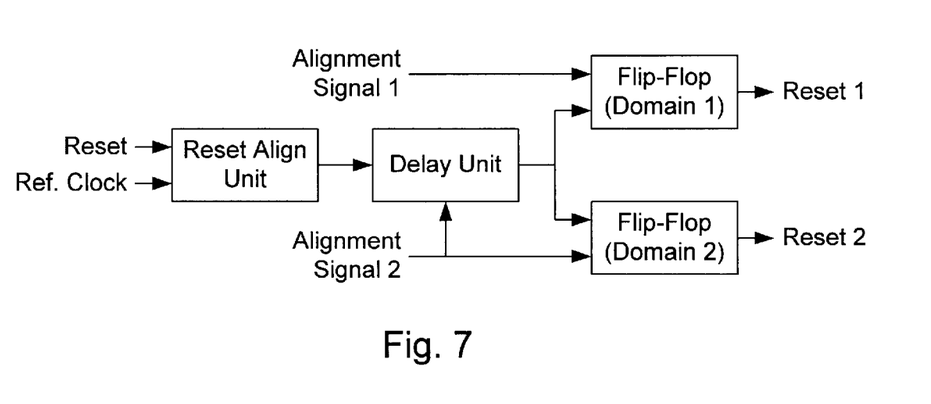
FIG. 7 is a functional block diagram of a synchronous reset unit in one embodiment.

$delay_{min}$ is the minimum signal delay between the clock domains;

$T_{skew}$ is the skew between the clock signals of the transmitting and receiving clock domains;

$T_{setup}$ is the setup time for the flip-flops;

$T_{hold}$ is the hold time for the flip-flops; and $N_{shift}$ is the number of flip-flops required to account for the shift between the clock signals (as shown in FIGS. 6 and 7.)

In a particular embodiment, fewer flip-flops or more flip-flops than the four illustrated in FIG. 4 may be necessary. For example, if the skew between the clock signals of the two clock domains increases, the required number of flip-flops may increase to five or more. Conversely, if there is no skew between the clock signals, only two or three may be necessary. It should also be noted that the number of flip-flops calculated according to the foregoing formula represents a minimum number and some embodiments may use more than this minimum number.

It should be noted that other embodiments may use devices other than flip-flops to store the transferred data bits. For example, one or more multiple-entry FIFO (first in, first out) memory devices can be used. If the flip-flops in the embodiment described above are replaced with multiple-entry FIFOs, several data bits can be loaded in each FIFO before the bits are retrieved, thus reducing the required number of storage devices (but increasing the complexity of the devices.) In fact, the flip-flops of the embodiment described above function as a FIFO which can be loaded and unloaded at different rates.

The pulse generator 58 may accomplish this function in a number of ways, such as looking up the appropriate pattern according to the values of M and N (i.e., the clock ratio) or dynamically computing the pattern. It is contemplated that the function of the pulse generators may also be accomplished in other ways.

In one embodiment, the pattern generators are initialized to generate a particular skip pattern prior to any data transfer. During initialization, the M and N values corresponding to the transmitting and receiving clock domains are passed to the pattern generators. The patterns are then generated according to the received M and N values before any transfer takes place. During initialization, the system must also set the unload and load counters to the appropriate values so that stable data can be a retrieved from the flip-flops. If the load counter is initialized to 0 (corresponding to the first flip-flop,) the unload counter can be initialized to a value determined by the bit-time and the sum of ($delay_{max}$–$delay_{min}$), $T_{skew}$, and ($T_{setup}$+$T_{hold}$). The bit-time can be determined from pin sampling or from the serial bitstream. (It should be noted that, since transfers from a first clock domain to a second clock domain and transfers from the second clock domain to the first are handled separately, the initialization values for each of these transfers may be different.)

As explained above, it is important that the clock skipping buffer be properly initialized and synchronized to ensure that data can be transferred from one clock domain to the other. This entails two primary functions. First, the clock signals of the two domains must be aligned. That is, the clock skipping pattern must be applied to the load or unload counters when the clock signals are in alignment. (For example, the '0' pulses in FIG. 2 are aligned.) If the clock signals are not aligned (e.g., if the skipping pattern is started on the on the '1' pulses,) there will be additional skew which is not accounted for and which may prevent reliable data transfer. Second, the load and unload counters of the buffer must be synchronously reset. If the counters are not started at the same time, the data in the buffer may not be unloaded at the right time. If the buffer is unloaded too early, the data may not have been stored yet. If the buffer is unloaded too late, the data may have been overwritten.

Figure 5:
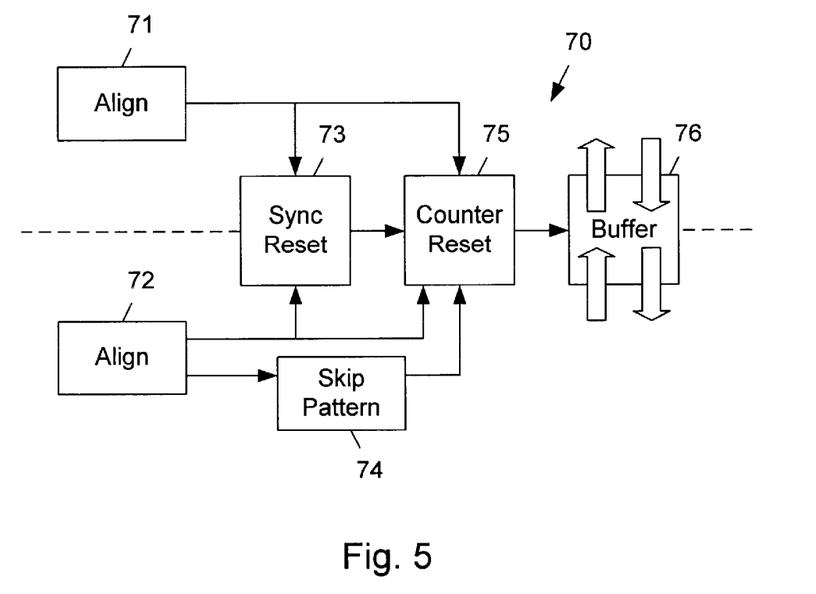
FIG. 5 is a functional block diagram of a circuit which is configured to logically align and initialize a clock skipping buffer in one embodiment.

Referring to FIG. 5, a functional block diagram of a circuit which is configured to logically align and initialize a clock skipping buffer is shown. The circuit comprises a pair of alignment detection units 71 and 72, a synchronization reset unit 73, a skip pattern generator 74, a counter reset unit 75 and a data transfer buffer 76. Each of alignment units 71 and 72 is configured to detect the alignment of the clock signal in one of the clock domains with a reference clock signal. When the respective clock signal is in substantial alignment with the reference clock signal, a signal indicative of the alignment is generated. (It is noted that the signals will be "logically" aligned rather than exactly aligned because of the skews which are inherent in the system.) This signal is conveyed to synchronization reset unit 73 and counter reset unit 75. The alignment signal generated by alignment unit 72 is also conveyed to skip pattern generator 74.

It should be noted that, in the embodiment depicted in the figure, alignment unit 71 resides in the clock domain having the lower clock frequency, while alignment unit 72 resides in the clock domain having the higher clock frequency. Because clock pulses need to be skipped only in the clock domain having the higher clock rate, only this clock domain requires a skip pattern generator. In other embodiments, where variable clock frequencies do not gurantee one domain to always have the fast clock, clock pulses may be skipped in both clock domains, in which case a second skip pattern generator coupled to alignment unit 71 would be employed.

Synchronous reset unit 73 accepts the alignment signals from alignment units 71 and 72 and generates synchronized reset signals (i.e., one for each of the two clock domains) to initialize counter reset unit 75. Counter reset unit 75 contains the load and unload counters which control the flow data through data transfer buffer 76. After the synchronized reset signals generated by synchronous reset unit 73 are received, counter reset unit 75 begins generating load and unload pulses corresponding to the respective clock domains and transmitting these signals to the data transfer buffer 76.

As noted above, the clock signals of the two domains are generated from the same reference clock signal. At some time, and recurring every reference clock period thereafter, the clock signals are coincident (at least to within certain tolerances.) In FIG. 2, this point is identified by falling edge 0 of each of the two clock signals generated by the PLLs. This point is also coincident with the falling edge of the reference clock signal. An alignment detection circuit as shown in FIG. 6 is provided for each of the two clock domains to detect the alignment of the respective clock signals.

Referring to FIG. 6, a functional block diagram of an alignment unit is shown. As explained above, the alignment unit is used to detect alignment of the clock signal in one of the two clock domains with a reference clock. (Identical circuits are used to detect alignment of the clock signals in both clock domains, so the structure of the circuit will be described here with reference to a single one of the domains.) The circuit can be broken down into three main components: an edge detecting portion; a programmable delay portion; and a signal offset portion. These components are not necessarily physically separate, but are conveniently described in this manner. In other embodiments, the design of the alignment unit may vary.

The alignment detection portion of the circuit is configured to receive two signals: the clock signal corresponding to the clock domain of the circuit; and a divided clock signal. The divided clock signal is the output of the respective divider circuit (either 45 or 46) shown in FIG. 3. The divider output signal is essentially the same as the reference clock signal, but it is shifted from the reference clock signal. The PLL adjusts the clock signal, which in turn shifts the divider output in a manner as to eliminate the difference between it and the reference clock. The edge detector generates a signal indicating that the edge of the divided clock signal has been detected, and asserts this signal for one clock period (of the clock signal in the respective clock domain, not the reference clock period.) The offset and programmable delay portion of the circuit serves to delay the asserted signal for the remainder of the reference clock period so that it can be output by the circuit on the next occurrence of the falling edge of the divided clock signal. The offset and programmable delay portion of the circuit is configured to produce two signals: an alignment signal; and a skip reset signal.

The alignment signal coincides with the falling edge of the divided clock output. The skip reset signal is identical to the alignment signal, but is shifted temporally to lead the alignment signal by several clock cycles. The skip reset signal is shifted so that it can be processed through several levels of logic in anticipation of the alignment signal. The skip reset signal is used to reset the skip pattern generator so that it will be properly initialized when alignment signal is asserted. The alignment signal generated by the alignment unit is conveyed to the synchronous reset unit and the synchronous counter unit. The skip reset signal is conveyed to the skip pattern generator. (As explained above, there may only be one skip pattern generator in the system, so the alignment unit in a clock domain which does not have a skip pattern generator does not need to produce the skip reset signal.)

The alignment units enable the system to be logically aligned. That is, the coincident falling edges of the clock signals in the two clock domains are identified. (It should be noted that the clock signals may nevertheless be skewed slightly, so the edges may be shifted by this skew.) The proper alignment of the clock skip pattern allows the load and unload counters to run at the same effective rate and transfer data with minimal latency between the two different clock domains. As indicated above, however, the system must also have a mechanism to synchronously reset the load and unload counters so that they start at the same time and are aligned with the clock signals. Then, the storage locations in the buffer will be loaded and unloaded in the proper sequence. This function is performed by the synchronous reset unit.

Referring to FIG. 7, a block diagram illustrating a synchronous reset unit is shown. The synchronous reset unit can be broken down into three major components: a reset transfer circuit; a delay circuit; and concurrent reset generation circuit. The reset transfer circuit accepts an asynchronous reset signal, synchronizes it to the reference clock and transfers it into a clock domain using the alignment signal of one of the two clock domains. In the present embodiment, the reset signal is transferred with the alignment signal of the clock domain having the slower clock rate. In other embodiments, the reset signal may be transferred into the faster clock domain. The resulting reset signal is input to the delay circuit. The delay circuit is designed to delay the reset signal to enable the safe transfer of the reset signal to each of the two clock domains despite a potentially large skew between them. The delay should be greater than the potential skew between the clock domains to avoid assertion of a reset signal in one of the clock domains in a different reference clock period than in the other clock domain. If the signal were not delayed and the reset signals in the two clock domains were asserted in different clock periods, transferred data could be lost or corrupted. The delayed reset signal is conveyed to the concurrent reset generation circuit, which generates a separate reset signal for each of the two clock domains upon receiving the next alignment signal from the respective clock domains. The reset signal for each of the two clock domains is aligned with the respective alignment signal.

Referring to FIG. 3, it can be seen that, in one embodiment, the clock signals in the two clock domains are generated by two PLLs from a reference clock signal. The clock signal of each domain is divided by M or N (the ratio of the respective clock domain's clock rate to that of the reference clock) and fed back into the PLLs. The PLLs then adjust the phases of their respective clock signals until the divided clock signals are substantially aligned with the reference clock signal.

In one embodiment, the reset transfer circuit comprises a series of flip-flops which are clocked by these different clock signals (i.e., the reference clock, the divided clock output signal and the slow domains' clock signals.) An asynchronous reset signal is first synchronized in a flip-flop that is clocked by the reference clock signal. This allows reset timing to be specified in regard to the external reference clock. The output of this flip-flop is then captured in a flip-flop that is clocked by one of the divided clock signals which is input to the PLL (e.g., points C or F of FIG. 3). The difference between the reference clock and the divided clock is the PLL phase error, which is predictable and manageable. The output of the second flip-flop can then be transferred into a third flip-flop that is clocked by the output of the divider circuits (e.g., points B or E). The output of the third flip-flop can then be transferred into a flip-flop that is clocked by the clock domain signal (e.g., points A or D). Each transfer accounts for a small amount of clock skew which is predictable and manageable. The synchronized reset signal is thereby "walked back" from the reference clock signal to the align signal in a controlled and deterministic fashion to produce an aligned reset signal (i.e., a reset signal aligned with the align signal of the clock domain.) The aligned reset signal is then input to the delay circuit.

The delay circuit serves to delay the aligned reset signal for a predetermined amount of time. The delay should be greater than the maximum possible skew between the align signals in the two clock domains. After the aligned reset signal has been delayed, it is transmitted to the concurrent reset generation circuit.

In the concurrent reset generation circuit, the delayed aligned reset signal is received, along with the align signals from each of the two clock domains. A reset signal is asserted in each of the two clock domains the next time their respective align signals are asserted. The purpose of the delay is to ensure that the reset signals are asserted in alignment with two align signal pulses which corresponding to the same reference clock pulse instead of consecutive reference clock pulses.

The reset signal which is asserted in each clock domain causes the initial values to be loaded into the load or unload counter, respectively, and to start the counters on corresponding aligned pulses of their respective clock signals. Thus, it can be ensured that the counters will be started at the proper time and that the load counter will lead the unload counter by the amount necessary to allow the clock skipping buffer to transfer data as described above. By using the alignment signals to transfer the reset into each domain, the two resets are logically concurrent and any difference between them caused by skew is managed by adding extra stages to the clock skipping buffer.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. In a microprocessor having a clock-skipping buffer for transferring data between a first clock domain having a first clock signal and second clock domain having a second clock signal, a circuit comprising:

a first alignment unit, wherein said first alignment unit is configured to detect the alignment of a pulse of said first clock signal with a reference clock pulse;

a second alignment unit, wherein said second alignment unit is configured to detect the alignment of a pulse of said second clock signal with said reference clock pulse;

a synchronous reset unit coupled to said first and second alignment units and configured to receive an asynchronous reset signal, wherein said synchronous reset unit is configured to generate a first reset signal which is aligned with said clock pulse in said first clock domain and a second reset signal which is aligned with said clock pulse in said second clock domain; and a counter reset unit coupled to said synchronous reset unit to receive said first and second reset signals, wherein said counter reset unit is configured to reset a load counter based on one of said reset signals and to reset an unload counter based on the other of said reset signals.

2. The circuit of claim 1 wherein said first alignment unit is configured to generate a first alignment signal which is substantially coincident with said clock pulse in said first clock domain and said second alignment unit is configured to generate a second alignment signal which is substantially coincident with said clock pulse in said second clock domain and wherein one of said alignment units is configured to generate a skip reset signal.

3. The circuit of claim 2 further comprising a skip pattern generator coupled to receive said skip reset signal.

4. The circuit of claim 3 wherein said skip reset signal leads said first and second alignment signals and wherein in response to receiving said skip reset signal, said skip pattern generator begins producing a skip pattern signal which starts concurrently with one of said alignment signals.

5. The circuit of claim 1 further comprising a clock generating circuit configured to generate said first clock signal and said second clock signal from said reference clock signal, wherein said clock generating circuit includes a first PLL configured to substantially align a first pulse of said first clock signal with a first pulse of said reference signal and a second PLL configured to substantially align a first pulse of said second clock signal with said first pulse of said reference signal.

6. A method for resetting a clock-skipping buffer comprising:

in each of two clock domains, detecting each pulse of a corresponding clock signal which is substantially aligned with a corresponding reference clock pulse;

receiving an asynchronous reset signal;

generating an aligned reset signal in one of said clock domains, wherein said aligned reset signal is substantially aligned with one of said detected aligned pulses of said corresponding clock domain;

delaying said aligned reset signal by an amount greater than a maximum skew between said clock signals in said clock domains; and in each of said two clock domains, asserting a synchronous reset signal.

7. The method of claim 6 further comprising in each of said two clock domains, loading and initiating a counter in response to asserting said corresponding synchronous reset signal.

8. The method of claim 7 wherein said synchronous reset signal is asserted concurrently with a next detected aligned pulse of said corresponding clock domain.

9. The method of claim 7 wherein one of said counters is a load counter for said clock-skipping buffer and one of said counters is an unload counter for said clock-skipping buffer.

10. The method of claim 6 further comprising, in one of said clock domains which includes a skip pattern generator, generating a skip reset signal which leads a corresponding one of said detected aligned pulses.

11. The method of claim 10 further comprising, in response to receiving said skip reset signal, generating a skip pattern which starts concurrently with said corresponding one of said detected aligned pulses.

12. The method of claim 6 wherein generating an aligned reset signal which is substantially aligned with one of said detected aligned pulses of said corresponding clock domain comprises: generating a first intermediate reset signal which is substantially aligned with a pulse of said reference clock signal; in response to generation of said first intermediate reset signal, generating a second intermediate reset signal which is substantially aligned with a pulse of an intermediate clock signal; and in response to generation of said second intermediate reset signal, generating said aligned reset signal.

13. In a microprocessor having a clock-skipping buffer for transferring data between a first clock domain and second clock domain, a circuit comprising:

a first alignment unit, wherein said first alignment unit is configured to assert a first alignment signal indicative of the alignment of a pulse of a clock signal in said first clock domain with a pulse of a reference clock signal;

a second alignment unit, wherein said second alignment unit is configured to assert a second alignment signal indicative of the alignment of a pulse of a clock signal in said second clock domain with said pulse of said reference clock signal;

a synchronous reset unit coupled to said first and second alignment units and configured to receive an asynchronous reset signal and said first and second alignment signals, wherein said synchronous reset unit is configured to generate a first reset signal which is aligned with said first alignment signal and a second reset signal which is aligned with said second alignment signal; and a counter reset unit coupled to said synchronous reset unit to receive said first and second reset signals, wherein said counter reset unit is configured to reset a load counter based on said first reset signal and to reset an unload counter based on said second reset signal.

14. The circuit of claim 13 further comprising a skip pattern generator coupled to one of said alignment units.

15. The circuit of claim 14 wherein said one of said alignment units is configured to generate a skip reset signal and to convey said skip reset signal to said skip pattern generator.

16. The circuit of claim 15 wherein said skip reset signal leads said alignment signal corresponding to said one of said alignment units and wherein in response to receiving said skip reset signal, said skip pattern generator is configured to generate a skip pattern signal which is aligned with said alignment signal corresponding to said one of said alignment units.

17. The circuit of claim 13 further comprising a data transfer buffer coupled to said counter reset unit, wherein said data transfer buffer is loaded according to said load counter and unloaded according to said unload counter.

* * * * *